United States Patent [19]

Luc

[11] 3,899,377

[45] Aug. 12, 1975

[54] BONDING ALUMINIUM

[76] Inventor: Penelope Jane Vesey Luc, 18, rue Fourcroy, Paris 17$^e$, France

[22] Filed: July 9, 1974

[21] Appl. No.: 486,845

Related U.S. Application Data

[63] Continuation of Ser. No. 191,080, Oct. 20, 1971, abandoned, and a continuation-in-part of Ser. No. 830,831, June 5, 1969, abandoned.

[52] U.S. Cl. .............................. 156/73.5; 29/470.3
[51] Int. Cl. ..................... B29c 27/08; B23k 27/00
[58] Field of Search ................ 156/73.5, 73.6, 73.4; 29/470.3; 228/2

[56] References Cited
UNITED STATES PATENTS

| | | | |
|---|---|---|---|
| 3,175,284 | 3/1965 | Cotovsky | 29/470.3 |
| 3,222,235 | 12/1965 | Buchner | 156/73 |
| 3,234,642 | 2/1966 | Hollander | 29/470.3 |
| 3,242,029 | 3/1966 | Dean | 156/73 |
| 3,331,719 | 7/1967 | Soloff | 156/73 |
| 3,418,196 | 12/1968 | Luc | 156/73 |
| 3,438,428 | 4/1969 | Balamuth et al. | 156/73 |
| 3,541,671 | 11/1970 | Frachot | 156/73 |
| 3,693,238 | 9/1972 | Hoch et al. | 156/73 |

FOREIGN PATENTS OR APPLICATIONS 1,080,442  8/1967  United Kingdom.................. 156/73

*Primary Examiner*—Douglas J. Drummond
*Attorney, Agent, or Firm*—Kenyon & Kenyon Reilly Carr & Chapin

[57] ABSTRACT

In the formation of an adhesive or cohesive bond between aluminium and a metal, a liquid, paper or a thermosetting plastics material the surface of the aluminium to be bonded is affected by frictional treatment consisting of applying a rapidly moving tool frictionally to that surface, to another surface of the aluminium or to a surface of a layer intervening between the tool and the aluminium. Examples of the process are the joining of broken web ends of aluminium foil, the seaming of aluminium plate and the lamination of aluminium foil to woven glass or cotton cloth.

16 Claims, No Drawings

BONDING ALUMINIUM

This is a continuation of application Ser. No. 191,080, filed Oct. 20, 1971, now abandoned and a continuation-in-part application of Application Ser. No. 830,831, filed Jun. 5, 1969 (now abandoned).

The present invention relates to processes for the formation of adhesive or cohesive bonds in or to aluminium. The bond formed may be directly metal-to-metal between two aluminium parts or between aluminium and another metal or may be formed via a non-metallic coating on one or both of the metal parts or a layer of material between them, or may be between aluminium and certain non-metals, particularly paper. The non-metal may be a liquid. An adhesive bond is one in which an interface between the parts bonded is still present; a cohesive bond is one in which the interface has disappeared so that in effect the parts bonded have become integral with each other.

The invention achieves this bonding by a frictional process. In this, one or both of the parts to be joined is frictionally treated by a frictional tool as, or just before, the bond forms between the parts. The bond will usually be in the form of a seam-line, but may be over a wide area, to form a laminate, or may be discontinuous.

The mechanism of bonding in this process is not at present known. It certainly involves the supply of energy from a tool used to effect the treatment on an outer surface of the assembly of materials to be bonded, to their interfaces, but it is entirely distinct from such processes as friction-welding (where both parts are partly fused by being rubbed against each other until melted and then are upset by being pressed together under high pressures,) and ultrasonic sealing processes in which a tool or sonotrode applies mechanical vibrations in the ultrasonic range to the work against an anvil, welding the materials by a hammering action. It also differs from thermal heat sealing methods (where essentially the metal is coated either all over, or in the seal area, with an adhesive or material which can serve as one) which apply heat and pressure to a laminate comprising aluminium or to a coated aluminium surface thus joining it to another coated surface. In the present process, although a certain amount of heat is generated between the tool and the part it is treating, this need be nowhere near enough to actually melt the material on the macroscopic scale; although some pressure is applied, it need only be sufficient to keep the parts to be bonded in intimate contact and can be of an entirely different order from the pressures needed in friction-welding or ultrasonic welding; and even in the case where a metallic or non-metallic coating or interposed layer is between the metal parts in the seam, this is not necessarily reduced to a liquid state in the process. Such a coating or layer is itself affected by the frictional treatment by the same unknown mechanism.

The principle applications of the present process lie in the packaging industry. For example the process may be used to secure, either by lamination across the width of a web, or by formation of a bond line or lines, selective area lamination or sealing, or spot sealing or welding of aluminium sheet or foil to itself or to other materials, for example to uncoated or to coated paper, (for applications in the packaging of tobacco products) or to thermosetting materials such as polyamides or epoxy resins or to weld aluminium to a container to seal it or to attach an aluminium tag to a container or package. This includes the production of laminates comprising two or more components, for example a laminate comprising aluminium foil, a plastic layer and paper.

The process also has applications in the manipulation of aluminium foil and sheet and in manufacturing processes comprising products containing aluminium parts. It may be used for example to secure together at high speed the ends of a broken web of aluminium foil in the course of its production. Spot or line welding of aluminium foil and plate to other metals including steel is a further application of the process, applicable not only to the packaging industry, but to the metallurgical industry and building industries in general.

In carrying out processes of the present invention no liquid adhesive need be used and metal to metal welds or seals can be achieved, nor is there any need to specially prepare the parts which are to be bonded. Surprisingly when aluminium is at least one of the materials to be bonded, the oxide layer will not usually need to be removed. Moreover, even if a non-metallic coating is present on one metal part there is no need to prime or otherwise prepare the other metal part for its reception, and no necessity to use a flux.

Investigation of the metal to metal bonds formed by the process at the interfaces of the parts to be assembled show that it is possible to achieve a completely cohesive bond in which the interface has disappeared and no line of separation exists even when viewed through a microscope at X800. Although the physical mechanisms involved in the metal to metal bonds obtained by the present process are not yet entirely understood, it is possible that molecular diffusion occurs at the contacting interfaces. The scope of the present invention therefore comprises products where bonds between either aluminium and aluminium, or aluminium and another metal show these characteristics.

Further the process permits the formation of narrow seam lines, patterned or shaped seals, or spot welds or wide area lamination or treatment.

The aluminium may be any suitable form including a metallization layer.

Although the process can be employed to obtain metal to metal joints it is also possible to employ a material, such as a coating or a strip of thermosetting film which will act as an adhesive or cement in the area of the seal.

Previously coated aluminium could only be joined to a similarly coated surface but according to the present process it is possible to join a coated surface of aluminium to an uncoated surface of aluminium, whether the bonding formed is metal-metal or metal-coating-metal.

Coatings may be utilised in the seal area either as an overall coating or as a strip applied in liquid form to one surface and then allowed to dry prior to the welding operation, or in the form of a strip of film inserted between the surfaces prior to the bonding operation. Adhesive or cementing compounds may also be applied to the seam area in the form of particulate material which for convenience of operation is preferably fused to one surface prior to joining. The overall coating of foil is the most widely used method of obtaining an adhesive layer, and in the case of aluminium foil it adds strength and other properties to the foil layer.

Metallic compounds or layers may also be used as cementing agents in the seal area, for example, a layer of aluminium foil may be placed between two layers of aluminium plate to act as an adhesion promoter, and a narrow strip of solder may also be placed between the seal interfaces for the same purpose. Particulate metallic materials may also be used.

The bonding effect of the frictional treatment may be aided by auxiliary excitation of the area where the bond is formed, by application of vibrational energy in the sonic and ultrasonic range or by application of electrical or thermal energy. In all cases however, under the conditions of application of the process, either the amount of auxiliary excitation applied is not in itself enough to cause formation of the bond and unless the frictional treatment were to be applied, no bond would be formed, or in cases where the auxiliary means of excitation are alone capable of creating bonds, the bonds formed when these means are used in conjunction with the frictional process are superior to those which would be formed if auxiliary means of excitation alone were used. For example, the bonds are of higher quality, or they are formed at a faster rate, with less pressure or in a generally more efficient manner.

The use of auxiliary excitation also permits the energy used and applied by the frictional tool to be less than would otherwise have been needed to effect a bond in any particular situation, or inversely to permits a reduction of the amount of energy provided by a more costly source of auxiliary excitation than would be required if such means were employed singly.

Again, the ultrasonic tool may be placed at a tangent or horizontally to the surface of the materials to be joined with the friction tool juxtaposed on the opposite surface or may be associated with the friction tool. The efficiency of the ultrasonic process is greatly improved in the former manner of operation, and for example, pressures normally required when operating the ultrasonic process alone can be reduced and also resistance to the movement of the work past the welding tool. In consequence wear on the expensive ultrasonic welding tool will decrease considerably, while welding or sealing speeds will be greatly increased. It has also been found possible when the two processes are combined, to form bonds in materials which ultrasonics alone are unable to bond.

The band of vibrational energy which can be associated with the frictional process is much wider than that normally employed in ultrasonic equipment and systems employing both sonic and high to very high frequencies can be used including an electrodynamic vibrator or oscillator driven by a power amplifier which will act upon a device or membrane backing the materials to be bonded simultaneously with the application of the friction tool to its opposite surface.

In applications to continuous sealing or laminating the friction wheel can serve as an earthed electrode while a wheel on the opposite surface of the work can be connected to a high frequency generator.

The tool usually to be used will be a rotating wheel of smooth friction resisting hard wearing material, particularly a wheel made of "Vespel" (du Pont regd. Trade Mark) filled with either molybdenum disulphide, carbon or grafite, or of "Tufnol" a laminated synthetic resin product reinforced with paper, fabric, or asbestos. Tufnol is a registered Trade Mark of Tufnol Ltd., Perry Bar, Birmingham, England.

Other wheels which may be used are of ceramic and felt, which can have a metallized surface, and also wheels made of metal such as Carbon Steel, Chrome Nickel and Molybdenum alloy steels known as H.S. steels or Tungsten Carbide alloys. These metal wheels can be especially treated, coated or hardened. Wheels can also be made of aluminium and aluminium alloys, graphite, and a variety of resins including fluorocarbon polymers and copolymers, epoxies, and filled or unfilled thermoplastic or thermosetting resins.

These wheels will preferably be from 4 to 8 cms in diameter and be run at a speed of about 3000 to 45,000 rpm. or in the case of high frequency driven rotary tools to 100,000 rpm. or more. A suitable motor to drive the wheel in rotation is a ½ h.p. electric motor taking 600 watts and capable of speeds of 54,000 rpm controlled through a transformer. Much more powerful tools of from 1 to 3½ h.p. have however been used successfully, and are better equipped for continuous running. High frequency rotary tools are preferred for some applications and can be used at much higher rpm, but require special convertors.

When pressure is applied it is normally exerted against a backing which may be a wheel, roller, a stationary sheet or a travelling band, or a device, for example a pressure controlling device. In some cases however pressure may be exerted against a product which, for example, is being overwrapped, while in others the pressure may be so low that the strength of the materials themselves, when held between supports, is enough to enable the necessary intimate contact to be formed when the tool is pressed against them between the supports. In some instances it is possible to apply pressure from a friction tool to an intermediate material which does not in itself apply pressure to, or come into contact with, the materials which are to be joined.

Pressure applied (either directly and wholly by the tool or partly by the tool and partly by the additional pressure-exerting means) will vary widely according to the thickness and other characteristics of material(s) being bonded. For example when aluminium foil is sealed to itself or to a substrate such as paper pressure applied by a rotary wheel need not exceed a few grams $cm^2$. However, when sealing sheet of aluminium pressures may be in the order of $50kg/cm^2$, or more may be applied from an external pressure source to bring the sheets into sufficiently close contact for bonding to occur as a result of application of the frictional process. In all cases where pressure is applied by the frictional element alone, applied pressure is much lower than that used either in ultrasonic or forge welding processes.

During bonding operations and immediately following them it is preferable to assist and to maintain good contact of the interfaces of the materials to be joined, by contact means which are independent of the actual friction source. This will avoid application of high pressure on the work through the friction source such as a friction wheel, and will greatly reduce the energy requirements of the process as well as wear on the friction tool. It will also reduce to a minimum any mark made by the tool on the metal or other surface with which it is in direct contact. Apart from independent pressure means provided in the seal area or bonding area, it is possible for this purpose to provide a vacuum which will hold the materials to be joined in close contact, and it is also possible to exert air pressure on the assembly of materials to be joined. The friction tool can itself be provided with air suction or pressure means to ensure good contact with the materials to be joined.

The means described are of course non-limitative and many other systems can be successfully employed for handling and forming the materials to be bonded.

Sealing speeds realised in conjunction with the process are very high and for example, 20 micron thick aluminium foil can be joined at speeds of 1 to 2 meters second, or spot welds of aluminium to aluminium and aluminium to plastic in as little as 1/25th second, while the work may be moved past the friction tool or the tool past the work.

Equipment for lamination in width will in general comprise a large circumference roller as a friction source, or a series of such rollers, (the roller or rollers may be embossed to cause bonding in selected areas only) and a backing roll which may if necessary be heated or cooled according to the materials to be laminated together, their thickness and other properties. Where aluminium foil is to be laminated to a substrate, soft materials such as silicone rubber and felt has been found effective as a friction roll covering, the felt is hard compressed felt and can be used directly on the metal foil surface with the additional advantage that it also polishes the surface.

A preferred method for high speed lamination is to use a backing roll of very high temperature and a fast rotating friction roll on the opposite side of the laminate. If a thermoplastic layer is present as one of the materials in the laminate complex, the temperature on the backing roll will preferably be higher than of the melt point of the thermoplastic.

If the product to which the aluminium foil or sheet is to be laminated itself has raised areas, for example, if it is a metallic or plastic honeycomb structure and the aluminium foil or sheet is to be applied as a skin to its surface then the honeycomb structure will be covered by the aluminium skin and conveyed on a table beneath the friction source, which will bond the two together.

The process is also applicable to the bonding of aluminium to liquids, e.g. coatings or printing inks. Although in some cases the liquid would have, even without the frictional treatment, wetted the aluminium, the effect of the treatment is to improve and increase the bond strength, and in some cases to cause wetting and bonding where none would have occurred without the treatment.

Frictional treatment of aluminium according to my process, not only gives greatly improved adhesion of a subsequently applied coating but allows this coating to be applied in a single operation. The weight of the applied coating can also be reduced without decreasing its adhesion to the aluminium or to the aluminium foil component of a laminate, for example, one composed of aluminium foil — adhesive — draft paper.

Aluminium can be treated either directly or indirectly to improve its adhesive properties. When indirect treatment is carried out, an intervening material is placed between the friction source and the material to be treated, in general however surfaces are directly treated by the frictional element. The effect is persistant and treatment may be carried out some time before the operation involving the contacting or wetting of the aluminium surface with the liquid is performed.

Materials which can be used to make the rollers which will be used to treat the materials to improve their adhesive properties across the web, are preferably soft and non-abrasive. For example, they can be made of felt, wool or raised cotton, velvet or of nylon fabrics, nylon and other synthetic furs, soft tufted carpeting and the like.

Low frictional speeds in the order of 1000 to 10,000 rpm, depending upon the speed of web travel, have proved effective on an industrial laboratory line for the treatment of an aluminium foil surface comprised in a complex paper — adhesive — aluminium foil laminate.

In the present process, the frictional tool may be, but is usually not applied to any of the surfaces actually to be secured together. It usually works through the thickness of at least one layer of material being applied to the surface of a sheet opposite that which is to be bonded. It need not contact any of the surfaces of the part to be bonded and may work through an intervening layer of a material resistant to the adhesive or cohesive effect of the frictional treatment under the conditions used.

Thus an assembly of materials can be sealed or laminated together at their contacting interfaces by direct contact of one or more of the outer surfaces of the assembly to be bonded with a friction tool, or an intervening material or device may be placed between this assembly and in contact with the friction tool without inhibiting the bonding effect of the frictional treatment. The intervening layer or device if used, does not adhere to or become part of the final product and one of its roles is to reduce the mechanical action of the friction tool on the outer surfaces of the materials to be joined, and in certain cases to increase the effect of the phenomenon causing bonding. In certain cases bonding can be produced by the action of the friction tool upon an intervening layer or device even where such a layer or device is in the viscinity, but not directly in contact with the assembly to be bonded.

Polytetrafluoroethylene coated glass cloth is a particularly good material for this purpose. Metal foil and sheet material is also particularly effective during the bonding of fairly thick gauges of aluminium, but the side in contact with the assembly to be welded should preferably carry a release coat.

When an intervening material is present and particularly in the case of metal-metal bonding in which the upper or outer layer of material to be bonded is aluminium sheet, it has been found preferably to lubricate the frictional tool to avoid transfer of aluminium to its surface and to avoid scaring of the surface of the aluminium sheet.

Examples of apparatus for carrying out processes within the present invention are shown in the drawings accompanying the Complete Specification of U.K. Pat. No. 1,224,891.

Specific examples of processes within the invention will now be given:

EXAMPLE 1

The Joining Across a Web of Two Broken Web Ends of 20/100 as Aluminium Foil

During "in-plant" manufacture of aluminium foil, breaks sometimes occur across the web which has then to be welded together, production being held up during this operation. To repair the web the method at present used is an ultrasonic welding technique in which an ultrasonic horn, generally in the form of a wheel, traverses the overlapping edges of the web welding them together. Energy consumption of this process is high and speeds do not generally exceed 7 or 8 meters/minute. Costs of ultrasonic tool parts and generator are also high. The present frictional process offers a high speed economical apternative method for web joining.

The rotary tool is fixed to a fast web traverse mechanism capable of speeds of 1 metre/second or more. It is boxed in so that only the lower wheel edge protrudes from the box. The metal backing roll is covered with hard carbon filled rubber to give a soft backing to the friction wheel and prevent fast wear. The friction wheel is made of molybdenum disulphide filled polyimide resin material, and has rounded contoured edges, a diameter of 5.50 cms. and a width at the working surface of 2 mm.

Input to a ½ h.p. watt 240 volt drive motor for the wheel is set on the dial face of a variac transformer at 80% giving an approximate speed of 30,000 rpm. Pressure of the wheel on the foil surface does not exceed 200 to 300 grs at a contact area at approximately 2 mm$^2$. The tool and traverse mechanism are started simultaneously and a 1 meter wide web is joined in 1 second.

A true cohesive bond exceeding the tear strength of the aluminium foil is formed at the foil interfaces at speeds which result in the minimum amount of production stoppage.

In a further type of equipment for welding web ends, the weld is formed continuously without any stoppage to the machine.

EXAMPLE 2.

The Sealing of Aluminium Foil to Paper

Sealing conditions are the same as in Example 1, but the hard rubber backing is covered with soft aluminium sheet 1 mm thick. Seals are made in the travel direction of the web and a 1 h.p. rotary motor is used to drive three wheels simultaneously. The aluminium foil web is placed on top of a web of paper tissue of the type used for cigarette packet lining, and they are wound up onto a single wind-up roller. Sealing speeds can exceed 1 meter/second, and the resultant bond is sufficient to allow use of the laminate in numerous packaging applications.

EXAMPLE 3.

The Seaming of Two Aluminium Plates Strip Coated with Nylon 11 in the Joint Area, to Each Other Two decorated and protectively coated aluminium sheets 25/100 mm thick are taped to a backing surface of hard rubber with their edges overlapping in an area where one of them has received a strip of coating of "Nylon 11", the overlap being 5 mms wide. To prevent removal of the decorative coat by the friction wheel an intervening layer of "Teflon" (polytetrafluoroethylene (E. I. Dupont De Nemours)) is taped over the overlap joint area. The assembly (with a wooden block serving as a rigid backing) is attached to a rail system so that it can be moved past the friction wheel which is 4 mms wide and has a diameter of 7.5 cms. Voltage input to the rotary motor is 60% and pressure applied at contact point of the wheel and the working surface is 3 Kgs. Speed of traverse of the assembly in relation to the friction head is 20 cms/second. The resultant bond is a very strong one and a one inch strip remains unbroken at loads of 200 lbs.

EXAMPLE 4

The laminating of aluminium foil to woven glass cloth

Aluminium Foil 20 $\mu$ thick is taped to a sample of woven glass cloth, and this is placed on a backing surface of rubber composition, which is itself glued to a wooden plank attached to the traverse rail rig. The friction head consists of a 3 cms wide 4 cms diameter, hard compressed felt head and voltage input to the rotary motor is 70%. Pressures are in the order of 2 Kgs at contact point, and the assembly is moved past the friction head at speeds of approximately 30 cms/second. The result is that the foil is bonded to the glass cloth and the aluminium foil is simultaneously textured.

EXAMPLE 5.

The Laminating of Aluminium Foil to Woven Cotton Cloth

Exactly the same set-up and parameters are used as for Example 4 above but the rotary tool speed is increased and input energy increased to 80%. This results in lamination of the aluminium foil to the cotton fabric without the use of an adhesive.

EXAMPLE 6.

The Bonding on Aluminium Sheet 110 Micron Thick to Tin Free Steel 150 Microns Thick A sheet of tin free steel is placed over a sheet of aluminium using essentially the same apparatus as in Example 3. It is clamped to a table under sufficient pressure to bring the two sheets into close contact, but with a gap in the clamping device where the seal is to be formed. A tungsten carbide wheel having a contact surface of 3 mm's wide and a diameter of 8 cms is used to firmly weld the steel to the aluminium sheet at a speed of 10 cms second. Opening devices based on this principle can be used to open aluminium cans or can tops.

I claim:

1. A method of bonding aluminum to a material of the group consisting of a paper and a non-resinous cloth, the bonding occurring at a predetermined area of the aluminum and the material at which a bond is desired, comprising the steps of:
   i. subjecting at least one of the surfaces of:
      a. the aluminum to be bonded, the surface of the aluminum, excluding the predetermined area of the surface of the aluminum at which bonding is desired and consisting of at least one of at least:
         1. the portion of the surface of the aluminum adjacent to, and
         2. the portion of the surface of the aluminum substantially opposite to the predetermined area of the surface of the aluminum at which bonding is desired, and
      b. a layer of solid material adjacent a surface opposite the surface having the predetermined area, of one of:
         1. the aluminum having the predetermined area at which bonding is desired, at the predetermined area, and
         2. the material of the group at the predetermined area of the material at which bonding is desired,
   to a frictional treatment, the frictional treatment comprising the subjection of the at least one surface to dynamic friction created by a rotary tool in contact with the at least one surface.
   ii. bringing the predetermined area of the surface of the aluminum at which bonding is desired into intimate contact with the predetermined area of the surface of the material of the group at which bonding is desired, and iii. maintaining the predetermined areas of the surfaces of the aluminum and the material in intimate contact at least during the step of subjecting, whereby the aluminum and the material are bonded in the predetermined area.

2. A method according to claim 1, in which the frictional treatment further includes the operation of the tool in accordance with predetermined parameters including the surface speed of relative motion between the tool and the surface subjected to a frictional treatment and the contact pressure and time duration of engagement of the tool with the surface subjected to a frictional treatment.

3. A method of forming a cohesive bond at a predetermined surface location between one of aluminum sheet and aluminum foil and a material of the group consisting of a metal sheet, a metal foil, a paper material, and a non-resinous cloth material comprising the steps of:

i. bringing a surface of the aluminum to be bonded into intimate contact with the surface of the material with which the aluminum is to be bonded at the location of the aluminum and the material corresponding to the location at which a bond is desired to be formed;

ii. exerting a force upon the aluminum and the material to create a pressure of from approximately 2 grams/cm$^2$ to a magnitude of 50 kilograms/cm$^2$ at the location of the aluminum and the material in intimate contact; and iii. subjecting at least one of the surfaces of:

a. the aluminum to be bonded, the surface of the aluminum excluding the predetermined area of the surface of the aluminum at which bonding is desired and consisting of at least one of at least:
  1. the portion of the surface of the aluminum adjacent to, and
  2. the portion of the surface of the aluminum substantially opposite to the predetermined area of the surface of the aluminum at which bonding is desired, and b. a layer of solid material adjacent a surface opposite the surface having the predetermined area, of one of:
  1. the aluminum having the predetermined area at which bonding is desired, at the predetermined area, and
  2. the material of the group, at the predetermined area of the material at which bonding is desirable, to a frictional treatment, the frictional treatment comprising the subjection of the at least one surface to dynamic friction created by a tool in contact with the at least one surface, the treatment being equivalent to that provided by a wheel made of a smooth friction resisting hard wearing material, having a diameter in the range extending from about 4 to 8 centimeters, and being driven at a speed of at least 3000 to 100,000 revolutions per minute while in substantially tangent contact with the surface, the step of subjecting to a frictional treatment being carried out at least during the step of exerting a force upon the aluminum and the material;

whereby the aluminum and the material are cohesively bonded.

4. A method according to claim 3, and further including the step of applying lubrication between the surface subjected to the frictional treatment and the tool in contact with the surface.

5. A method according to claim 3 in which the step of subjecting consists of subjecting the portion of the surface of the aluminum opposite to and corresponding with the surface of the aluminum at which bonding is desired.

6. A method according to claim 3, and further including the step of applying auxiliary excitation to one of one and more than one of the aluminum and the material at an area of the surface of the one corresponding to the location of the area of the surface at which bonding is desired.

7. A method according to claim 6 in which the step of applying auxiliary excitation comprises the application of vibrational energy in the sonic and ultrasonic range.

8. A method according to claim 6 in which the step of applying auxiliary excitation comprises the application of electrical energy.

9. A method according to claim 6 in which the step of applying auxiliary excitation comprises the application of thermal energy.

10. A method according to claim 3 in which the layer of solid material adjacent the surface includes a layer of material resistant to the bonding effect of the frictional treatment, the layer of material resistant to the bonding effect being disposed contiguous with the one of the aluminum and the material.

11. A method according to claim 10 in which the layer of solid material which is adjacent the surface and is resistant to the bonding effect of the frictional treatment includes polytetrafluoroethylene.

12. A method according to claim 1 including the further step of forming an assembly of the aluminum and the material upon a backing member, the assembly being located with at least the predetermined area of the assembled aluminum and the material at which the bond is desired being contiguous with the backing member, and in which the frictional treatment includes the subjecting of the surface to dynamic friction created by a rotating tool in contact with the surface and in which the step of maintaining includes the application of pressure to the surface treated by the tool utilized to subject the surface to dynamic friction, the parameter of pressure applied by the tool depending on the thickness of the respective materials to be bonded and further being at least sufficient to bring facing surfaces of the material to be bonded into intimate contact at their interface.

13. A method according to claim 3 in which the step of exerting a force to create a pressure includes the application of pressure upon aluminum and the material by means independent of the tool utilized to subject the surface to a frictional treatment.

14. A method according to claim 3 in which an assembly of the aluminum and the material to be bonded is placed upon a backing surface with the predetermined area of the assembly to be bonded being located contiguous with the backing surface and a force is applied to the surface treated to create a pressure sufficient to bring the aluminum to be bonded into intimate contact with the material with which the aluminum is to be bonded, the force applied being applied by means of the tool utilized to create dynamic friction.

15. A method according to claim 1 in which the frictional treatment comprises treating the surface with a smooth friction resisting hard wearing material.

16. A bonded assembly of aluminum and at least one of the materials of the group consisting of a paper and a textile, the bonded assembly being produced by the method of claim 10.

* * * * *

UNITED STATES PATENT AND TRADEMARK OFFICE
CERTIFICATE OF CORRECTION

PATENT NO. : 3,899,377
DATED : August 12, 1975
INVENTOR(S) : Penelope Jane Vesey Luc It is certified that error appears in the above-identified patent and that said Letters Patent are hereby corrected as shown below:

Col. 7, line 4, "apternative" should be --alternative--;

Col. 10, line 5 "adh" should be --and--.

Signed and Sealed this

Eighteenth Day of October 1977

[SEAL]

Attest:

RUTH C. MASON
Attesting Officer

LUTRELLE F. PARKER
Acting Commissioner of Patents and Trademarks